P. C. MILLER.
WHEELED CULTIVATOR.
APPLICATION FILED OCT. 8, 1918.

1,315,567.

Patented Sept. 9, 1919.
2 SHEETS—SHEET 1.

Witnesses
W. C. Fielding
W. H. ——

Inventor
Paul C. Miller
By Richard B. Owen
Attorney

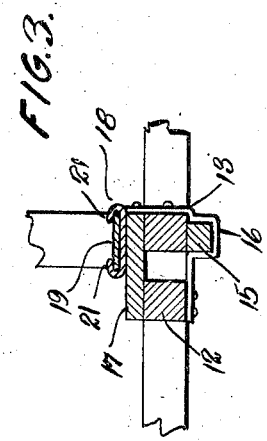
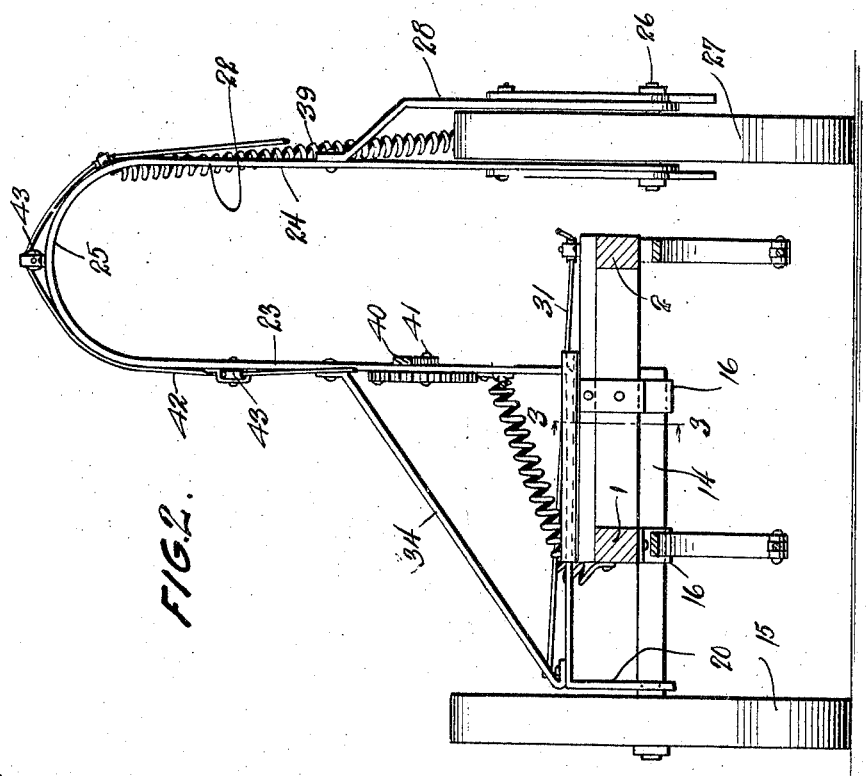

UNITED STATES PATENT OFFICE.

PAUL C. MILLER, OF HAGAN, GEORGIA.

WHEELED CULTIVATOR.

1,315,567.     Specification of Letters Patent.     Patented Sept. 9, 1919.

Application filed October 8, 1918. Serial No. 257,340.

*To all whom it may concern:*

Be it known that I, PAUL C. MILLER, a citizen of the United States, residing at Hagan, in the county of Evans and State of Georgia, have invented certain new and useful Improvements in Wheeled Cultivators, of which the following is a specification.

This invention relates to a wheeled cultivator and is particularly adapted for use in plowing, cultivating and siding corn, cotton, peanuts, and other crops which are planted in rows and which require careful cultivation to insure good products.

The invention contemplates the provision of a transversely adjustable wheeled cultivator adapted to carry a plurality of earth-working elements which may be properly disposed for engaging the ground at opposite sides of the growing crops so that two or more rows may be cultivated at the same time without interfering with or doing injury to the growing plant.

Another object of the invention is to provide an apparatus of this character which may be adjusted to permit the wheels to be received in the ordinary wagon ruts when the apparatus is being driven to and away from the planted fields, thereby making it unnecessary to provide other means of transporting the apparatus and permitting the operator to ride to and from his work.

The invention also aims to provide an improved wheeled cultivator which will require only one operator and which will include novel mechanism arranged whereby the operator may conveniently shift the various movable elements to properly adjust the wheels of the cultivator and also the earth-working elements themselves so that the apparatus will be suited to the conditions under which the operator is working.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which,—

Fig. 2 is a section taken on the line 2—2 of Fig. 1.

Fig. 3 is a section taken on the line 3—3 of Fig. 2.

Figure 1:
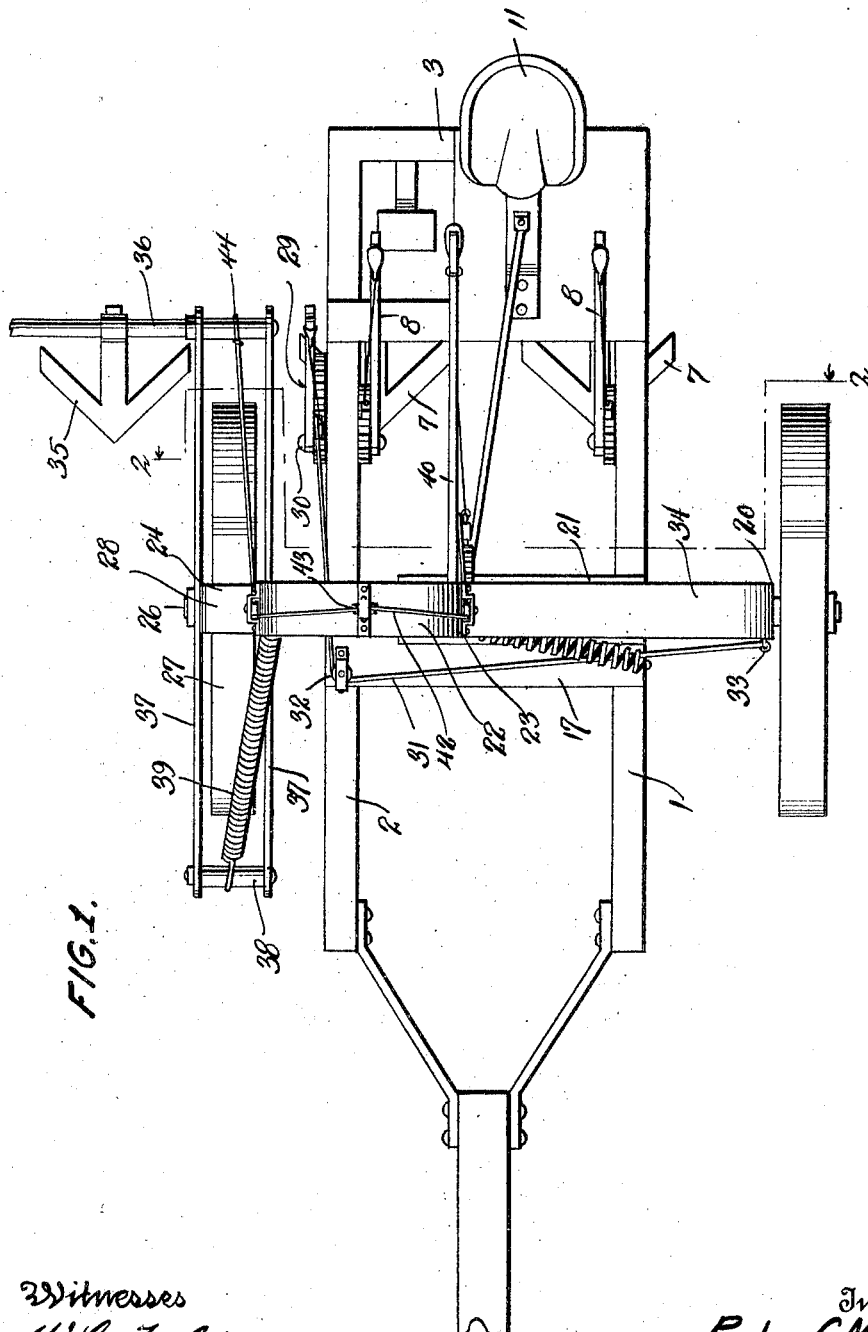
Figure 1 is a plan view of the apparatus constructed in accordance with my invention.

Referring to the drawings, wherein is illustrated the preferred form of my invention, in which like numerals of reference indicate like or corresponding parts throughout the several views, the supporting frame, includes the parallel frame bars 1 and 2 the forward ends of which are adapted to be secured to a suitable draft device whereby draft animals may be harnessed to the apparatus for pulling the same. The rear ends of the frame bars are secured together by the end cross bar 3. Cultivator blades 7 are suitably suspended from the frame and have actuating levers 8 connected thereto whereby the cultivator blades 7 may be raised and lowered. The cultivator blades at either side of the frame, therefore, may be independently adjusted by the actuation of the levers 8. The seat 11 upon which the operator is seated is mounted in a convenient place whereby any of the levers may be readily reached by the operator.

Supporting beams 12 and 13 are arranged within the frame approximately intermediate the ends thereof and extend transversely across the space between the frame bars 1 and 2. A supporting axle 14 is disposed beneath the beam 13 and is adapted to be moved longitudinally so that the wheel 15 which is attached to one end of the axle may be transversely adjusted with respect to the frame. The axle 14 is held in sliding contact with the beam 13 by suitable retaining elements 16. Mounted on the beams 12 and 13 is a relatively narrow platform 17 to which is secured a channel like guide member 18 which receives a sliding plate 19, one end of which is extended beyond the end of the guide member 18 and carries a depending hanger 20 fixed to the axle 14 adjacent the wheel 15 whereby this end of the axle will be supported. The plate member 19 is adapted to be longitudinally moved through the guide member 18, the latter being provided with flanges 21 as shown to advantage in Fig. 3 whereby the plate 19 is held in sliding engagement with the guide member. The end of the plate 19, opposite to the end to which the hanger 20 is attached, is connected to one end of the vertical supporting arch 22 which consists of the two upright bars 23 and 24 connected at their upper ends by an arcuate portion 25. The end of the upright 23 is fixed to the plate 19 and the lower end of the upright 24 is attached to the stud shaft 26 upon which the right hand wheel 27 is mounted. The opposite end of this shaft 26 is supported by an arm 28 which has its upper end connected to the upper portion of the upright 24 as shown to advantage in Fig. 2. It will be noted that the frame which carries the cultivator blades, and the upright supporting arch 22 are relatively transversely movable so that the wheel 27 may be moved toward the left for changing the distance between the wheels and also to move the upright supporting arch toward the right for clearing the growing plant over which the supporting arch will pass, when the device is in operation. To manually cause this change in the position of the parts, I have provided a lever 29 pivotally mounted on the frame bar 2 as indicated at 30, and which has connected thereto an operating cable 31 extended forwardly and passing around a roller 32 mounted on the top of the frame bar 2 from which point the cable extends transversely across the frame and is fixed as at 33 to the outer end of the plate 19. It will be noted that the latter is provided with a brace 34 which extends diagonally between the outer end of the plate 19 and the intermediate portion of the upright 23. When the lever 29 is pulled, the cable will draw the plate 29 for sliding it through the guide way 18 which will cause the upright supporting arch to move toward the left and away from the frame so that a row of growing plants may pass through the arch when the machine is in operation.

An auxiliary cultivator blade 35 is employed on the outside of the wheel 27 and is mounted upon a supporting shaft 36 which may be extended to any convenient length whereby any number of cultivator blades as indicated at 35 may be mounted at this side of the apparatus. The ends of the stud shaft 26 support the arms 37 disposed on opposite sides of the wheel 27 and having their rear ends connected to the shaft 36 for supporting the same while the opposite ends are joined as shown by a fastening bolt 36. The arms 37, therefore, are pivotally mounted on the stud shaft 36 and the cultivator blade 35 is normally held in engagement with the ground by the coil contractile spring 39 which has one end fixed to the bolt 38 and the opposite end joined to the upright supporting arm at a point near the upper end of the vertical member 24. These cultivator blades 35, however, may be raised out of engagement with the ground by an operating lever 40, which is pivotally mounted as at 41 on the upright member 23, and which has connected thereto a cable 42 passing over the top of the upright supporting arch through the medium of conveniently located rollers 43 and downwardly on the opposite side thereof from which point it is connected to the shaft 36 as indicated at 44.

Since any number of cultivator blades 35 may be mounted upon the shaft 36 it will be obvious that the operation of the lever 40 will cause the shaft 36 to rise so that all of the cultivator blades 35 will be raised out of engagement with the ground.

The foregoing description and accompanying drawings have reference to what might be considered to be the preferred or approved form of my invention. I desire it to be understood, that I may make such changes in the construction, combination and arrangement of parts, materials, dimensions, et cetera, as may prove expedient and fall within the scope of the appended claims.

Having thus fully described my invention, what I claim as new and desire to secure by Letters Patent, is:—

1. A device of the character described, comprising a frame, having cultivator blades suspended therefrom, a wheel arranged at one side of and supporting the said frame, an upright supporting arch movable laterally with respect to the said frame and slidably connected therewith and provided with a wheel opposite to the said first mentioned wheel and movable with the said arch, and means mounted on the frame and connected to the arch to receive manual actuation for imparting lateral movement to the said arch for varying the relative positions of the same with respect to the said frame.

2. A device of the character described, comprising a frame, cultivator blades suspended from the frame, the said frame being provided at one side with a wheel to support the frame, a wheel arranged at the opposite side of the frame independently thereof, an arched member having one end connected to the said independently arranged wheel and its opposite end slidably joined to the said frame to permit lateral movement of the arched member and the said connected wheel toward and away from one side of the frame, and means to impart the said movement to the arched member.

3. A device of the character described comprising a frame having cultivator blades suspended therefrom and provided with an axle extending from one side, a wheel mounted on the end of the axle to support the frame, a wheel mounted at the opposite side of the frame independently thereof and adapted to be moved toward and away from the frame, an arcuate upright member having one end supported from the said independently mounted wheel and the opposite end slidably connected to the said frame, a plurality of cultivator blades, attached to the said independently mounted wheel, means to move the said arcuate member laterally with respect to the said frame whereby the said wheel may be moved toward and away from the frame to carry the said connected cultivator blade therewith, and means to raise and lower the said last mentioned plow element.

4. A device of the character described comprising a pair of wheels adapted to be moved toward and away from each other and independently mounted, a frame supported by one of the wheels and provided with a guide way, an arcuate supporting member including parallel uprights connected at their upper ends with a curved portion, the lower end of one of the parallel members being provided with a plate slidably received in the said guide way whereby the said upright member may be moved laterally with respect to the said frame, the other parallel member being connected to and supported by the other wheel, a pair of arms pivotally mounted on the said last mentioned wheel and carrying a plurality of cultivator blades extending outwardly from the said wheel, means connected to the said plow elements and passing over the top of the said curved portion of the upright member to raise and lower the plow elements, the said means including a lever pivotally mounted on the frame to receive manual actuation, and means adapted for manual actuation to impart the necessary movement to the said plate for moving the said upright member laterally with respect to the said frame.

In testimony whereof I affix my signature in presence of two witnesses.

PAUL C. MILLER.

Witnesses:
W. L. Crow,
D. S. Clouton.

Copies of this patent may be obtained for five cents each, by addressing the "Commissioner of Patents, Washington, D. C."